Figure 1:
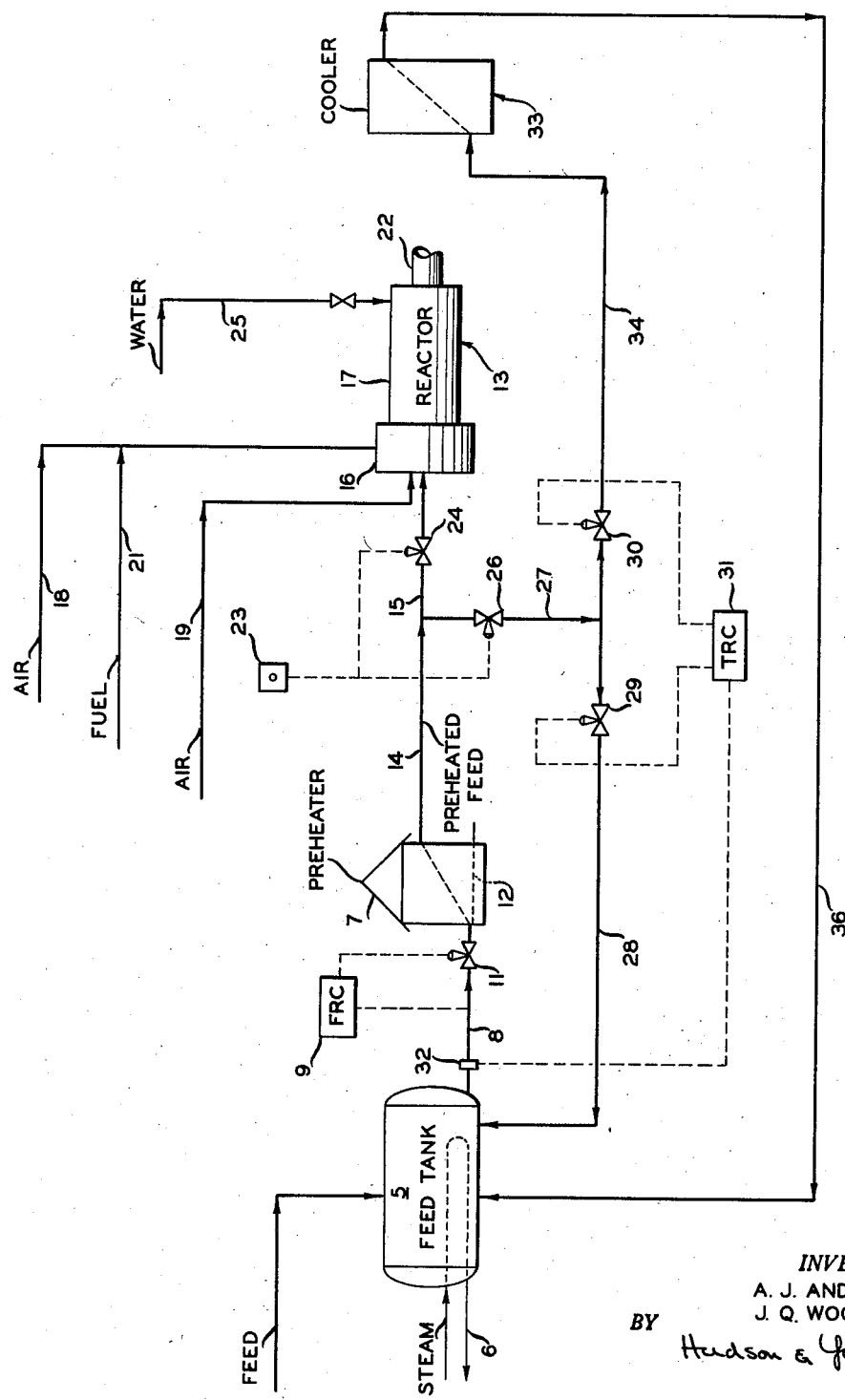

INVENTORS
A. J. ANDREWS
J. Q. WOOD
BY Hudson & Young
ATTORNEYS

United States Patent Office 2,895,805
Patented July 21, 1959

2,895,805

CONTROLLING FEEDSTOCK TEMPERATURE IN COMBUSTION PROCESS

James Q. Wood and Alvin J. Andrews, Bartlesville, Okla., assignors to Phillips Petroleum Company, a corporation of Delaware Application December 28, 1956, Serial No. 631,367

3 Claims. (Cl. 23—209.6)

This invention relates to controlling the feedstock temperature in a combustion process. In one of its more particular aspects, it relates to a method and apparatus for controlling the temperature of a stream of hydrocarbon charging stock in a carbon black process.

In a conventional carbon black process and apparatus, such as that disclosed by Joseph C. Krejci, U.S. 2,641,534, the stream of hydrocarbon charging stock is preheated in a Dutch oven-type heater or vaporizer and the resulting preheated charging stock is continuously injected into a retort or furnace where it is incompletely burned with combustion gases to produce carbon black. Alternatively, the stream of hydrocarbon charging stock in a carbon black process can be preheated by passing it from a feed tank to an indirect heat exchanger installed in the gas effluent or smoke pipe downstream from the reactor. When the reactor is normally operating, the preheated hydrocarbon charging stock is fed continuously and directly to the reactor. However, when the reactor is not in operation, for example, prior to start-up, during emergency shutdowns due to failures in process air, fuel supplies, etc., it is desirable to have the preheated hydrocarbon charging stock bypass the reactor and be recycled to the feed tank in order that the preheated charging stock is immediately available when the reactor is ready to operate. The recycling of the preheated charging stock is not without attendant problems such as overheating of the charging stock. The overheating of the charging stock may result in the cracking or coking of the charging stock in the feed tank, preheater or supply lines. This overheated charging stock may also damage the flow control apparatus in the charging stock supply line.

Figure 2:
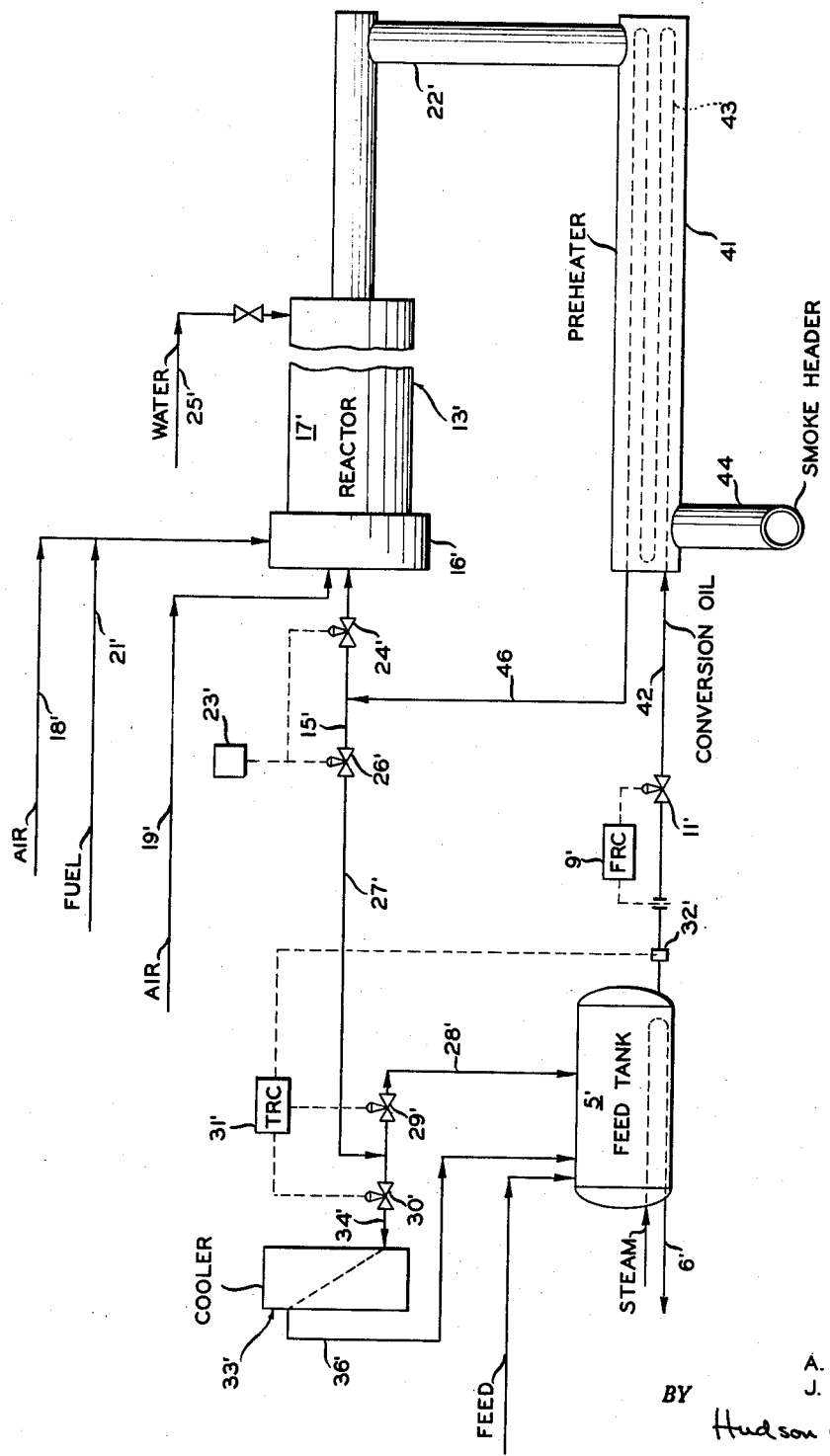

Accordingly, an object of this invention is to provide improved method and apparatus for controlling the feedstock temperature in a combustion process. Another object is to provide an improved method and apparatus for controlling the temperature of a stream of hydrocarbon charging stock in a combustion process such as that disclosed in the aforementioned patent to J. C. Krejci. Another object is to provide an improved method and apparatus for controlling the temperature of a hydrocarbon charging stock stream in a carbon black process in order to prevent the overheating of the preheated hydrocarbon charging stock when the reactor or furnace in the process is not in operation. A further object is to prevent the flow control apparatus in the hydrocarbon charging stock supply line from being damaged during the preheating of the charging stock while the reactor in the process is not in operation. A still further object is to prevent the cracking or coking of the preheated charging stock in the feed tank, preheater, etc., of a carbon black process. Other objects and advantages of our invention will become apparent, to those skilled in the art, from the following description, appended claims, and accompanying drawings in which:

Figures 1 and 2 are schematic flow diagrams of a combustion process, such as a carbon black process, illustrating various aspects of our invention.

Broadly contemplated, we propose by the practice of our invention to control the temperature of a stream of preheated hydrocarbon charging stock used in a combustion process, such as a carbon black process, when the reactor is not in operation, for example, prior to start-up of the reactor, or during the shutdown of the reactor due to various emergency conditions such as failures in air and fuel supplies, or in some aspects during repair or maintenance of the reactor. We accomplish this by having the stream of preheated hydrocarbon charging stock continuously bypass the reactor and recycling it back to the hydrocarbon charging stock feed tank; when the temperature of the hydrocarbon charging stock being conducted to the preheater reaches a predetermined value above which point it becomes overheated, the preheated hydrocarbon charging stock is continuously passed from the preheater to conventional cooling apparatus; the resulting cooled preheated charging stock is recycled to the feed tank until the reactor is ready to go into operation, at which time the preheated charging stock is continuously conducted to the reactor for the production of carbon black.

Although our invention finds particular application in a carbon black process, and our invention will be described as applied thereto, it is not to be unduly limited thereto since it is equally useful in any combustion process involving the burning of a preheated hydrocarbon with or without other reactants.

Referring to the drawing now, and to Figure 1 in particular, a flow diagram is shown which schematically outlines a portion of a carbon black plant illustrating the application of our invention in combination therewith. Hydrocarbon charging stock, such as a heavy oil (aromatic tar) derived from a cracking process which has an API gravity of 0 to 10 degrees is supplied from feed tank 5 which can be provided, if necessary, with a steam line 6 or other suitable heating means therein for raising the temperature of the charging stock to a point, e.g., 220° F., where it will readily flow. The charging stock is conducted from the feed tank 5 to a preheater or vaporizer 7 via line 8. A flow-recorder-controller 9 is connected to a flow meter in line 8 and is adapted to actuate motor valve 11 in line 8. The preheater 7, which can be a direct-fired preheater of the Dutch oven-type, preheats and/or vaporizes the charging stock to a selected temperature or range of temperatures, as 450–550° F. in the case of heavy oil such as aromatic tar, by the use of combustion gas, electricity, steam or other suitable heating means 12.

During normal operations, the resulting preheated charging stock is conducted to a reactor or furnace generally designated 13 via line 14. The reactor can have a short expanding cylindrical section 16 at the feed end and a smaller elongated cylindrical section 17 directly connected with the expanded section. Air lines 18 and 19 can feed tangential and axial air into the reactor and line 21 can feed tangential fuel, such as natural gas and the like, into the reactor. The preheated charging stock in line 14 can be axially fed into the expanded section 16 of the reactor. In operation, the reaction zone of the reactor remains at a substantial uniform temperature of the order of 1500° F. to 3300° F., preferably 2300° F. to 2600° F., depending on the quality of the carbon black being produced. In starting the operation of the reactor, it is preferred to preheat it to a temperature in excess of 1000° F., using sufficient air to provide complete combustion of the tangential fuel before introducing the axial charging stock stream. The hot reaction effluent or smoke produced by the incomplete combustion of the charging stock discharge from the reactor into a smoke pipe 22 which can lead to conventional carbon black recovery equipment (not shown) such as electrical precipitators, cyclones, and bag filters.

The reaction effluent or smoke can be quenched by water admitted through line 25 under the control of a valve therein. The purpose of the quench is to stop the reaction of the reactor gases at the proper point to obtain maximum carbon black production with optimum quality and to reduce the smoke temperature sufficiently to avoid undue deterioration of the smoke pipe and to prevent equipment downstream of the reactor from overheating. The quench temperature is usually maintained below about 1200° F. to 1400° F., preferably in the range of 1100° F. to 1200° F.

In the event that it is necessary to shut down the reactor 13 for purposes of repair, maintenance, or due to various emergency conditions, an emergency switch 23, which can be automatic or manual, is actuated so as to close a motor valve 24 in the charging stock supply line 15. At the same time, the emergency switch 23 opens a motor valve 26 in recycle line 27 so as to permit the preheated charging stock to bypass the reactor 13 and be recycled to the feed tank 5 via lines 27, 28.

As pointed out hereinbefore, the continuous recycling of the preheated charging stock to the feed tank gives rise to attendant problems due to the overheating of the charging stock. Accordingly, a flow control valve 29 or the like is positioned in recycle line 28 and flow control valve 30 is positioned in line 34. These valves 29, 30 are connected to a temperature-controller-recorder 31 which is connected with a temperature sensing element 32 in line 8. Flow control valve 29, when actuated by temperature-controller-recorder 31, is adapted to shut off the flow in recycle line 28 when the temperature of the recycled charging stock rises to a predetermined value above which point the charging stock becomes overheated. At the same time, flow control valve 30 is opened. This actuation temperature will depend on the type of flow meter in the charging stock supply line, the particular charging stock, the type of preheater, and various other factors, and generally will be in the range between 300° F. and 400° F. The preheated charging stock is thus conducted to conventional cooling equipment, such as a cooling tower, generally designated 33 via line 34. The resulting cooled preheated charging stock is then continuously recycled to the feed tank 5 via line 36.

When the temperature of the preheated charging stock falls below the predetermined temperature below which undesirable overheating does not occur, the temperature-recorder-controller 31 actuates valves 29 and 30 so as to open valve 29 and close valve 30. Should the temperature of the charging stock again rise to the predetermined value, valves 29 and 30 are again operated so as to permit the preheated charging stock to be passed to the cooling equipment 33 in a manner described above. When the reactor is ready to go into operation, the emergency switch 23 is actuated so as to open valve 24 and close valve 26 in order that the preheated charging stock having a constant predetermined temperature may be continuously fed to the reactor 13. If no provision were made to cool the preheated charging stock according to our invention, the temperature of the charging stock leaving the feed tank would eventually rise to the control temperature of the charging stock leaving the preheater. As pointed out hereinbefore, it is undesirable to have the charging stock in the feed tank at this high a temperature. Excessive cooling of the charging stock in the feed tank will not occur since the charging stock is again recycled to the feed tank without being cooled when the temperature of the stream in line 8 falls below a predetermined value.

As stated hereinbefore, the stream of hot reaction products in the smoke pipe downstream of the carbon black reactor can be utilized to preheat the hydrocarbon charging stock. Such an operation will now be described, reference now being made to Figure 2 in which elements of apparatus similar to that in Figure 1 have been designated with corresponding primed reference characters. The hydrocarbon charging stock is continuously fed from the feed tank 5' to a heat exchanger 41 via line 42. The heat exchanger 41 is connected to the smoke pipe 22' and contains a continuous tube bundle or simply a coil or tubing 43 with the feed line 42 connected with the inlet end thereof. Pipe 44 connects with the opposite end of the heat exchanger 41 and carries smoke or effluent gas to suitable carbon black recovery equipment (not shown) for the recovery of carbon black from the smoke. When the reactor 13' is not in operation, the preheated charging stock is recycled to the feed tank 5' via lines 46, 27' and 28'. During shutdown of the reactor 13' (at which time charging stock is not fed to the reactor 13'), the flow of tangential air and fuel may be continued so as to provide hot reaction effluent for the purpose of heating the indirect heat exchanger 41. As is the case with the process described above in regard to Figure 1, during shutdown of the reactor 13' the preheated charging stock is continuously recycled to the feed tank 5'. Should the temperature of the charging stock rise to a predetermined value above which point the charging stock is overheated, the temperature-recorder-controller 31' closes valve 29' and opens valve 30' in order to pass the preheated charging stock from the indirect heat exchanger 41 to cooling equipment 33', the resulting cooled charging stock being then continuously recycled to the feed tank 5' via line 36'. In other respects, the operation of the process schematically illustrated in Figure 2 is similar to that described hereinbefore in regard to Figure 1.

Although Figure 2 illustrates the use of a smoke pipe of a reactor not in operation, it is within the scope of our invention to use the smoke pipes of other reactors, which may or may not be shut down, for purposes of preheating.

Preferably the operations described hereinbefore are automatically controlled, however, it is within the scope of our invention to visually observe the temperature of the charging stock and to manually operate valves 24, 26, 29 and 30. Where a plurality of reactors, e.g., 12 are used in a reactor train, automatic control is especially preferred. It is also to be understood that our invention is not limited to any particular reactor configuration, or to any particular type of direct-fired preheater or cooling equipment, or to any particular type of charging stock.

Various modifications and alterations of our invention will become apparent, to those skilled in the art, from the foregoing description and accompanying drawing without departing from the scope and spirit thereof, and it is to be understood that they do not unduly limit our invention since they are merely preferred embodiments thereof.

We claim:

1. In a combustion process comprising conducting a stream of hydrocarbon charging stock from a source thereof to a preheating zone and continuously introducing the resulting preheated charging stock into a reaction zone for combustion thereof, the improvement comprising the steps of conducting said preheated charging stock so as to bypass said reaction zone and recycling the same to said charging stock source, conducting said preheated charging stock to a cooling zone rather than recycling the same directly to said source when the temperature of said stream of charging stock reaches a predetermined value, recycling the resulting cooled preheated charging stock to said charging stock source, and recycling again said preheated charging stock to said source rather than conducting the same to said cooling zone when the temperature of said stream of charging stock falls below said predetermined value.

2. In a carbon black process comprising conducting a stream of hydrocarbon charging stock from a source thereof to a preheating zone, continuously introducing the resulting preheated charging stock into a reaction zone along with combustion gases for the incomplete combustion thereof, and conducting the resulting reaction effluent to carbon black recovery equipment, the improvement comprising the steps of conducting said preheated charging stock so as to bypass said reaction zone and recycling the same to said charging stock source, conducting said preheated charging stock to a cooling zone rather than recycling the same directly to said source when the temperature of said stream of charging stock reaches a predetermined value, recycling the resulting cooled preheated charging stock to said source, and recycling again said preheated charging stock to said source rather than conducting the same to said cooling zone when the temperature of said stream of charging stock falls below said predetermined value.

3. In a carbon black process comprising conducting a stream of hydrocarbon charging stock from a source thereof to a preheating zone, continuously introducing the resulting preheated charging stock into a reaction zone along with combustion gases for the incomplete combustion thereof, and conducting the resulting reaction effluent from a heated zone downstream from said reaction zone to carbon black recovery equipment, said heated zone serving as said preheating zone, the improvement comprising the steps of conducting said preheating charging stock so as to bypass said reaction zone and recycling the same to said charging stock source, conducting said preheating charging stock to a cooling zone rather than recycling the same directly to said source when the temperature of said stream of charging stock reaches a predetermined value, recycling the resulting cooled preheated charging stock to said source, and recycling again said preheated charging stock to said source rather than conducting the same to said cooling zone when the temperature of said stream of charging stock falls below said predetermined value.

References Cited in the file of this patent

UNITED STATES PATENTS

| | | |
|---|---|---|
| 1,784,065 | Hargrove et al. | Dec. 9, 1930 |
| 2,435,041 | Hild | Jan. 27, 1948 |
| 2,788,264 | Bremer et al. | Apr. 9, 1957 |